United States Patent
Stevenson et al.

(10) Patent No.: US 7,265,313 B2
(45) Date of Patent: Sep. 4, 2007

(54) METHOD AND APPARATUS FOR IMPROVED COOLING OF RESISTANCE WELDING CAP

(75) Inventors: Robin Stevenson, Bloomfield, MI (US); Pei-Chung Wang, Troy, MI (US); Michael J. Karagoulis, Okemos, MI (US); Hai-Lung Tsai, Rolla, MO (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/242,736

(22) Filed: Oct. 4, 2005

(65) Prior Publication Data

US 2007/0075049 A1    Apr. 5, 2007

(51) Int. Cl.
*B23K 11/30*    (2006.01)

(52) U.S. Cl. ...................... 219/120; 219/119

(58) Field of Classification Search ............... 219/119, 219/120
See application file for complete search history.

(56) References Cited

U.S. PATENT DOCUMENTS

| | | | | |
|---|---|---|---|---|
| 3,909,581 | A * | 9/1975 | Stone et al. ............... | 219/120 |
| 4,588,870 | A * | 5/1986 | Nadkarni et al. .......... | 219/119 |
| 4,728,765 | A * | 3/1988 | Prucher ..................... | 219/120 |
| 4,760,235 | A * | 7/1988 | Flater ........................ | 219/119 |
| 6,355,901 | B1 * | 3/2002 | Nippert ..................... | 219/119 |
| 2006/0124697 | A1 * | 6/2006 | Stevenson et al. ......... | 228/101 |

\* cited by examiner

*Primary Examiner*—Len Tran

(57) ABSTRACT

According to the invention a hollow cylindrical shank of electrically conducting metal is connected to a resistance welder. A coolant supply tube passes through the shank and has an interior coolant supply passage. The coolant supply tube has an outer diameter less than the inner diameter of the hollow cylindrical shank. A weld cap seats on the shank and has a cap tip and a cap skirt that depends from the cap tip and is attached to the shank. An underside of the cap tip faces the shank and the supply tube. A coolant receiving bore formed into the underside of the weld cap extends into the cap tip to receive the coolant supply tube part way into the bore. The bore formed into the underside of the cap tip defines a bore sidewall that provides added area of heat transfer contact between the coolant and the cap tip.

22 Claims, 5 Drawing Sheets

METHOD AND APPARATUS FOR IMPROVED COOLING OF RESISTANCE WELDING CAP

FIELD OF THE INVENTION

The present invention relates to a method and apparatus for improving the cooling of a resistance welding cap.

BACKGROUND OF THE INVENTION

It is well known to weld together two sheets of metal using a resistance welding unit. Welding electrodes are applied to opposite sides of the metal panels and current is conducted through the electrodes to weld and fuse the panels together and form a spot weld. Over time the welding electrodes wear and must be replaced.

Accordingly it is well known that the welding electrode include a shank that is connected to the resistance welder to receive the weld current, and a replaceable weld cap, typically of copper alloy, that is either press fit or threaded onto or into the shank to permit removal and replacement of the worn weld cap.

It is also well known that the efficiency of the resistance welding process is improved by circulating a coolant, such as water, through the shank to cool the weld cap. The heat is transferred from the weld cap into the coolant and then carried away.

SUMMARY OF THE INVENTION

According to the invention a hollow cylindrical shank of electrically conducting metal is connected to a resistance welder. A coolant supply tube passes through the shank and has an interior coolant supply passage. The coolant supply tube has an outer diameter that is less than the inner diameter of the hollow cylindrical shank. A weld cap is seated on the shank and has a cap tip adapted to engage with a work piece to be welded. The weld cap also has a cap skirt that depends from the cap tip and is attached to the shank. An underside of the cap tip is surrounded by the skirt and faces the shank and the supply tube. A coolant receiving bore is formed into the underside of the weld cap and extends into the cap tip to receive the coolant supply tube at least part way into the bore so that coolant supplied through the supply tube effectively cools the cap tip. The bore formed into the underside of the cap tip defines a bore sidewall that provides added area of heat transfer contact between the coolant and the cap tip.

The method of designing such a weld cap includes relocating the mass of metal that was displaced by forming the bore elsewhere into the shape of the weld cap so that the weld cap remains of sufficient mass to act as a temporary storage medium for the heat that has been generated and is awaiting dissipation by transfer to the coolant that is supplied into the bore by the coolant supply tube.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiment(s) is merely exemplary in nature and is in no way intended to limit the invention, its application, or uses.

Figure 1:
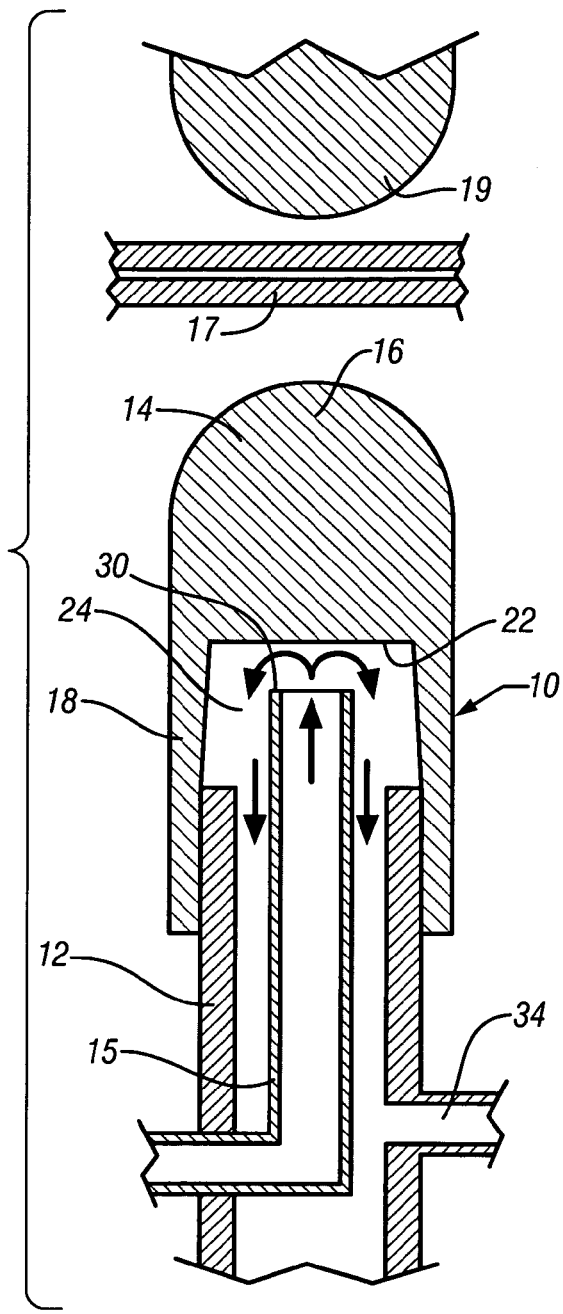
FIG. 1 is a side elevation sectional view of the welding electrode and coolant supply tube that is known in the prior art.

According to FIG. 1 a welding electrode is generally shown at 10 and includes a shank 12, a weld cap 14, and a coolant supply tube 15. The shank 12 is suitably attached to a welder, not shown.

The weld cap 14 is preferably of copper, or a copper alloy, and includes a cap tip 16 which will be pressed against a work piece 17, comprised of a pair of panels, that are to be welded together. An opposing electrode 19 will be pressed against the opposite side of work piece 17. The weld cap 14 also includes a cylindrical skirt 18 that extends from the cap tip 16 and closely surrounds the shank 12. The skirt 18 is shown as press fit onto the shank 12, but in the alternative may have threads that screw onto mating threads on the shank 12, but are not shown. As seen in FIG. 1 the cap tip 16 has an underside 22 that cooperates with the skirt 18 and with the shank 12 to define a coolant chamber 24. The coolant supply tube 15 extends through the center of the shank 12 and into the coolant chamber 24. The coolant supply tube 15 has a tube upper end 30 that is spaced away from the underside 22 of the cap tip 16. It will be understood that the lower end of the supply tube 15 is connected to a coolant pump, or other source of pressurized coolant, not shown. Coolant flows upwardly (when the electrode is oriented as shown in FIG. 1) through the coolant supply tube 15 to provide a constant flow of coolant through the coolant chamber 24 and then downwardly through the space between the shank 12 and the supply tube 15 to a drain port 34. Thus it will be understood that the flow of coolant through the electrode assembly 10 will transfer heat away from the weld cap 14 and the shank 12. It will be also understood and appreciated that the weld cap 14 is constructed of a certain mass of copper or copper alloy that will function as a heat storage medium pending the transfer of the heat out of the electrode 10 and into the stream of circulating coolant.

Figure 2:
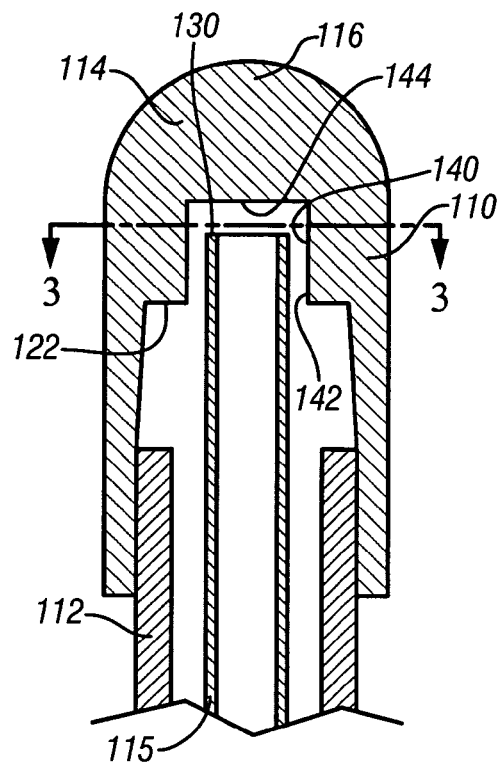
FIG. 2 is a view similar to FIG. 1 but showing an embodiment of the invention.
Figure 3:
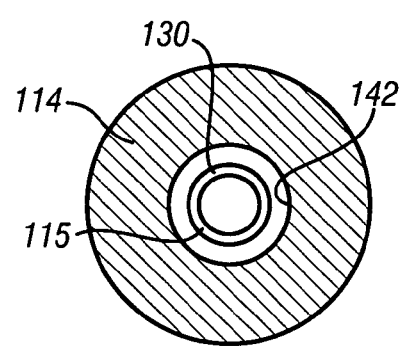
FIG. 3 is a section view taken in the direction of arrows 3-3 of FIG. 2.

FIGS. 2 and 3 show a new and improved electrode 110 of this invention, and includes a shank 112, a weld cap 114, and a coolant supply tube 115. The improved electrode 110 has a bore 140 that is drilled or otherwise formed into the underside 122 of the weld cap 114. As seen in FIGS. 2 and 3, the bore 140 is of a right circular cylindrical shape and includes a bore side wall 142 and a bore end wall 144. As seen in FIG. 2, the bore 140 reaches about half way into the mass of the weld cap 114. More particularly it is found that optimum performance is obtained with the bore sized so that that the bore end wall 144 is located 6 millimeters from the end of the cap tip 16. However, locating the bore end wall 114 within the range of 5-9 millimeters from the cap tip is also found to provide improved performance. In addition, FIG. 2 shows that the tube upper end 130 of the coolant supply tube 115 reaches up into the bore 140 and stops just short of the bore end wall 144. It is also seen that the bore sidewall 142 closely surrounds but is spaced from the outer diameter of the coolant supply tube 115. Thus it will be understood that coolant flowing through the coolant supply tube 115 will be directed directly onto the bore end wall 144 and flow downwardly around the outside of the supply tube 115 in contact with the bore sidewall 140. In this way, the coolant is supplied to the bore end wall 144 in closer proximity to the weld tip 116 and in closer proximity to the work piece 17 so as to expedite the transfer of heat away from the work piece 17. In addition, in comparison with the prior art electrode of FIG. 1, it will be appreciated that the bore side wall 142 adds a significant surface area against which the coolant circulates to thereby provide a greater area for heat transfer than occurred in the prior art design of FIG. 1.

It will be appreciated that forming the bore 140 into the underside 122 of the weld cap 114 will have the effect of removing material from the weld cap 114 that could otherwise serve as a temporary storage medium for the heat pending its transfer into the circulating coolant stream. Accordingly, in the weld cap of FIG. 2, the outer dimensions may be increased in dimension somewhat, in length or diameter, over the prior art design of FIG. 1 so that the overall mass of the weld cap 114 is equivalent to that of the weld cap 14 of FIG. 1.

Figure 4:
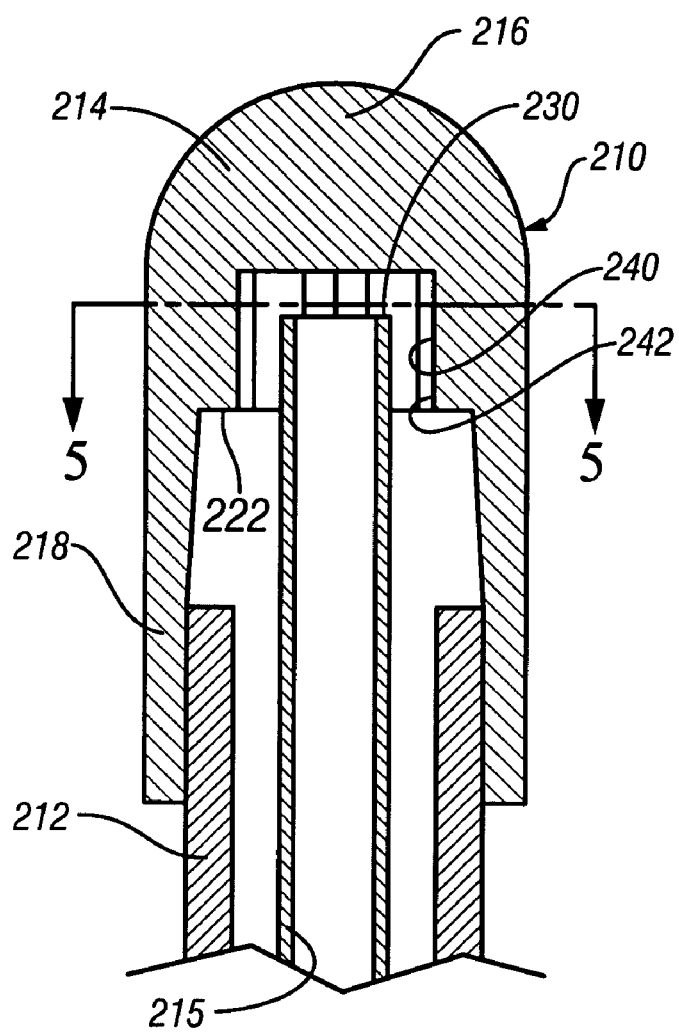
FIG. 4 is a side elevation sectional view showing another embodiment of the invention.
Figure 5:
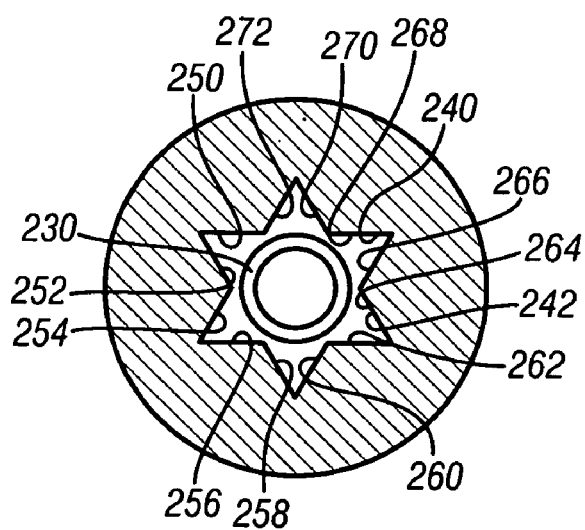
FIG. 5 is a section view taken in the direction of arrows 5-5 of FIG. 4.

FIGS. 4 and 5 show a second embodiment of the invention in which electrode 210 includes a shank 212, a weld cap 214 having a cap tip 216 and a skirt 218. The weld cap 214 of FIG. 4 is similar to the weld cap 114 of FIG. 2 except, as best shown in FIG. 5, a bore 240 of star shaped cross section has been provided in the underside 222 of the weld cap 214. FIG. 5 shows the bore 240 as being of a 6-point star shaped cross section. However it will be appreciated that the star shaped cross section may have 5 points, 7 points, or some other number of points.

In comparing the star shaped cross section of FIG. 5 with the circular cross section of FIG. 3, it can be appreciated that the star shaped cross section provides a bore side wall 242 that is comprised of 12 side walls 250, 252, 254, 256, 258, 260, 262, 264, 266, 268, 270 and 272, which, in the aggregate, add up to a surface area that is substantially greater that the surface area presented by the bore side wall 142 area of FIG. 3. This increase in side wall surface area provides a greater exposure of the circulating coolant to the weld cap 214 cooling tip to promote the transfer of heat away from the cap tip 216. In addition, it will be seen that the inner most apex of each of the intersecting side walls is closely spaced to the outer diameter of the supply tube 215, and will prevent the occurrence of any substantial misalignment of the supply tube by centering the supply tube 215 relative to the bore side wall 242.

Figure 6:
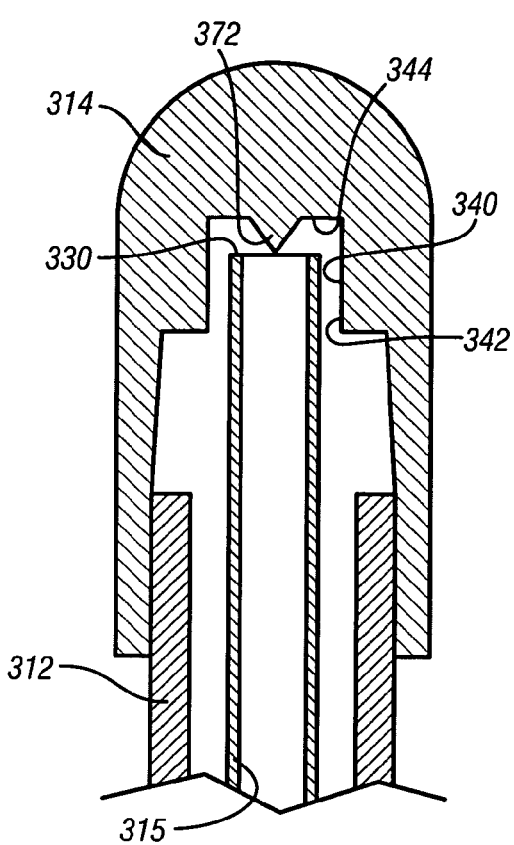
FIG. 6 is a side elevation sectional view showing another embodiment of the invention.

Referring to FIG. 6 yet another embodiment of the invention is shown, which is very similar to that of FIG. 2 and includes a shank 312, a weld cap 314 with a bore 340, and a coolant supply tube 315. In the embodiment of FIG. 6, a conical projection 372 projects downwardly from the bore end wall 344 and overlies the tube upper end 330 of the coolant supply tube 315. It will be understood and appreciated that coolant rising though the coolant supply tube 315 will be diverted by impinging on the conical projection 372 so that the fluid flow is uniformly diverted onto the end wall 344 and the bore sidewall 342. This design may help to avoid stagnation of the coolant, assure turbulent flow, and otherwise promote the transfer of heat out of the weld cap 314 and into the coolant.

Figure 7:
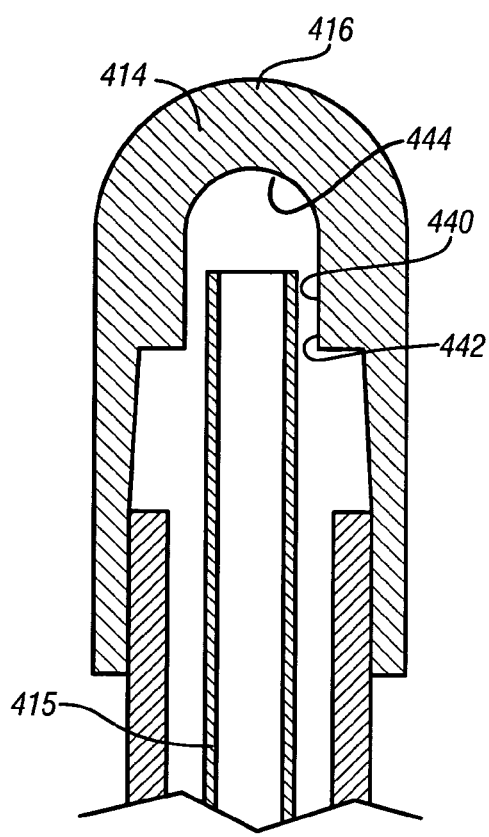
FIG. 7 is a side elevation sectional view showing another embodiment of the invention.

FIG. 7 shows another embodiment of the invention in which the weld cap 414 includes a bore 440 having a cylindrical sidewall 442 and a dome shaped end wall 444. A supply tube 415 reaches into the bore 440. Because the end wall 444 is of a dome shape, it parallels the outer shape of the weld cap 414 and thus is effective to provide more surface area for coolant contact than in the case of the straight across end wall 144 of FIG. 2.

Figure 8:
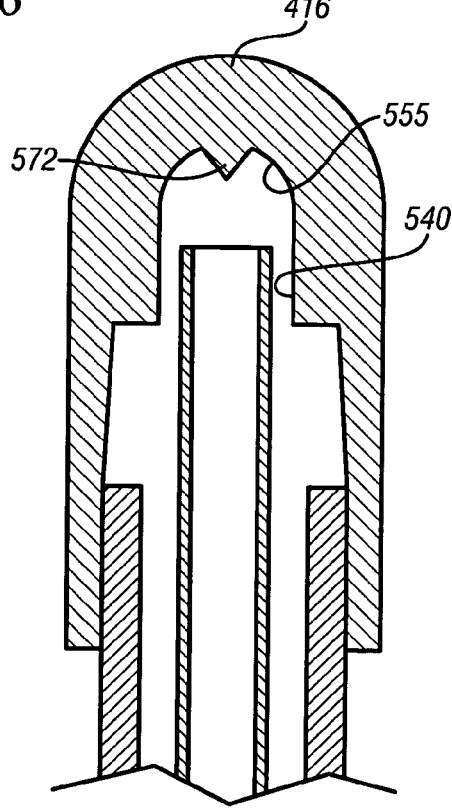
FIG. 8 is a side elevation sectional view showing another embodiment of the invention.

Referring to FIG. 8 yet another embodiment of the invention is shown in which the end wall 555 of the bore 540 is dome shaped as in the embodiment of FIG. 7, but also includes a conical projection 572 similar to that of FIG. 6. Thus the dome shape will present added surface area for coolant contact, while the cone shape projection 572 diverts and promotes the flow of the coolant.

Figure 9:
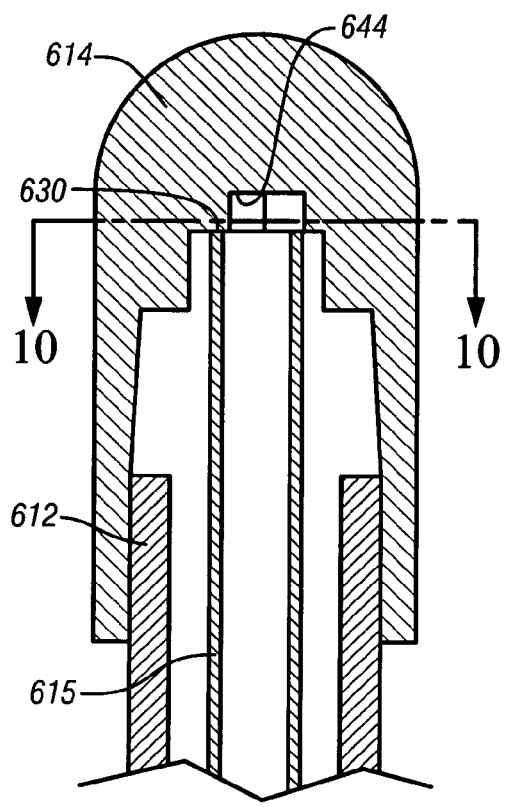
FIG. 9 is a side elevation sectional view showing yet another embodiment of the invention.
Figure 10:
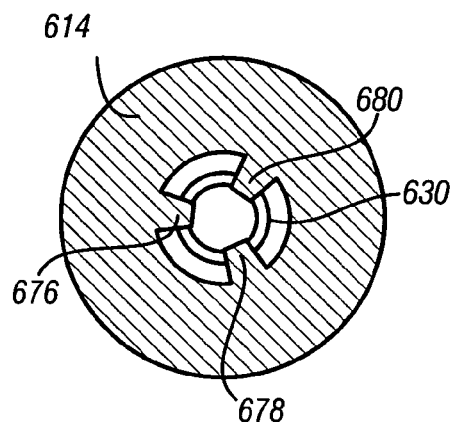
FIG. 10 is a section view taken in the direction of arrows 10-10 of FIG. 9.

FIG. 9 shows yet another embodiment of the invention. FIG. 9 is generally similar to FIG. 2. However as best shown in FIG. 10, standoff abutments 676, 678, and 680 are provided on the bore end wall 644 and reach into engagement with the upper end 630 of the supply tube 615. Thus, when the weld cap 614 is installed, the standoff abutments 676, 678, and 680 prevent the weld cap 614 from being pushed so far onto the shank 612 that there would not remain sufficient distance between the tube upper end 630 of the coolant supply tube 615 and the bore end wall 644 to assure a minimal passage for the flow of the coolant. Referring to FIG. 10, it will be appreciated that the standoff abutments 676, 678, and 680 each occupy only a small part of the circumference of the weld cap 614 so that a substantial coolant supply passage will remain between these standoff abutments for the flow of the coolant. It will be understood that instead of having standoff abutments on the weld cap, it may be desirable to provide the stand off abutments on the upper end 603 of the supply tube 615, in which case the stand off abutments on the supply tube would engage with the bore end wall 644 to maintain the minimal passage for the supply of coolant.

Figure 11:
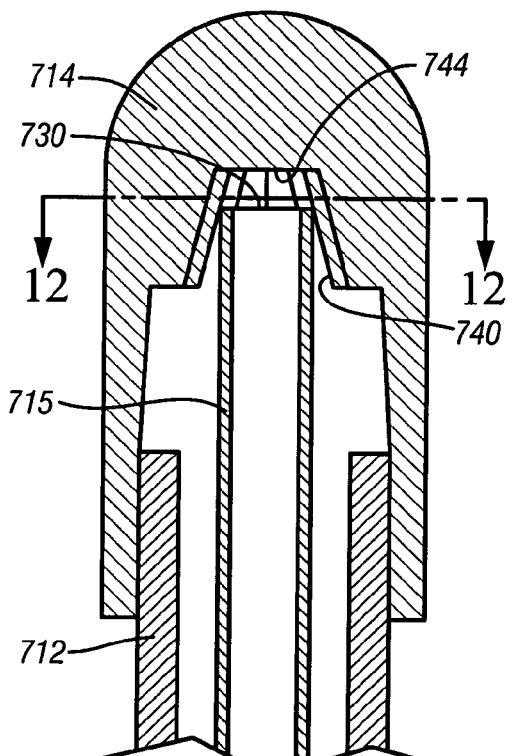
FIG. 11 is a side elevation sectional view showing another embodiment of the invention.
Figure 12:
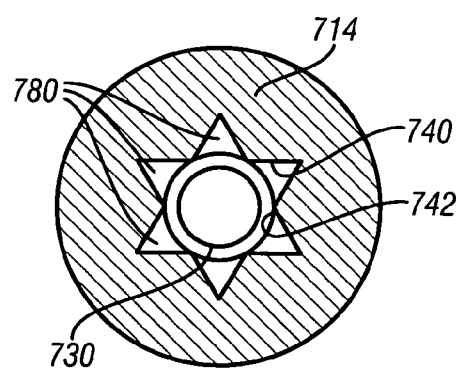
FIG. 12 is a cross section view taken in the direction of arrows 12-12 of FIG. 11.

FIGS. 11 and 12 show yet another embodiment of the invention. In this embodiment the bore 740 is of star shaped cross section. However, FIG. 11 shows that this star shaped cross section is, in the longitudinal view, a frusto-conical shape. Thus, in the embodiment of FIGS. 11 and 12, when the weld cap 714 is installed onto the shank 712, the end wall 730 of the coolant supply tube 715 will engage the bore side wall 742 of the star shaped cross section. In this way the tube upper end 730 of the coolant supply tube 715 is maintained a certain minimal distance away from the bore end wall 744 to assure that coolant rising through the coolant supply tube 715 will circulate against the end wall 744 of the bore and then circulate downwardly through the six passages 780 of the star shaped cross section. The weld cap 714 cannot be pressed so far onto the shank 712 that the tube upper end 730 of the coolant supply tube 715 would be blocked.

Figure 13:
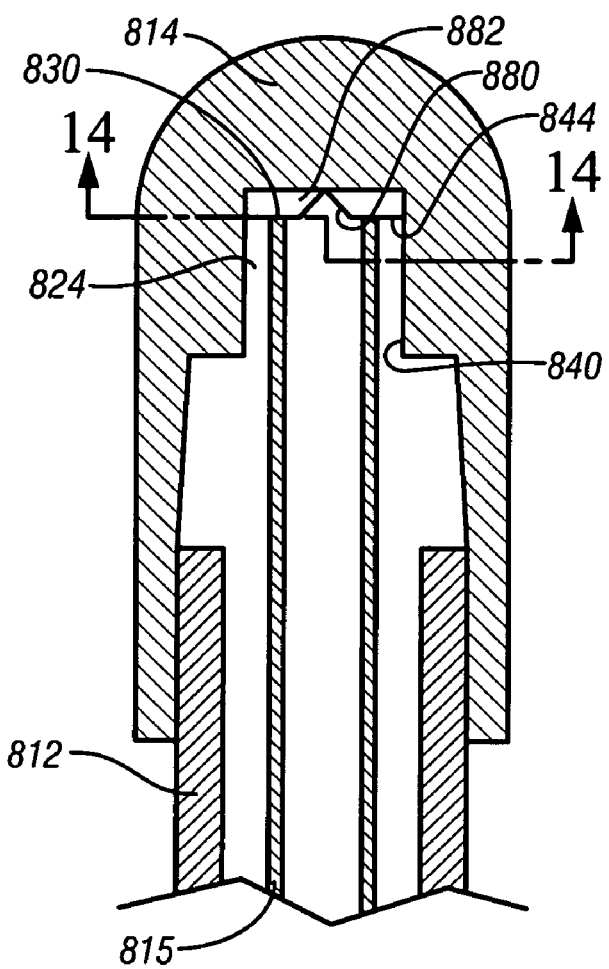
FIG. 13 is a side elevation sectional view showing yet another embodiment of the invention.
Figure 14:
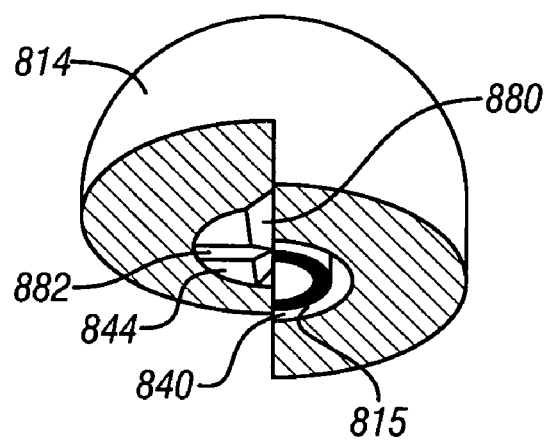
FIG. 14 is a perspective view of the weld cap taken in the direction of arrows 14-14 of FIG. 13 and having parts broken away and in section.

Referring to FIGS. 13 and 14, yet another embodiment of the invention is shown. Weld cap 814 has a bore 840 that receives the coolant supply tube 815. The bore end wall 844 of bore 840 is directly engaged by the tube upper end 830 of the coolant supply tube 815, thereby establishing a fixed location between the weld tip 814 and the coolant supply tube 815 when the weld cap 814 is installed onto shank 812. A channel 880 extends diametrically and bisects the bore end wall 844. A similar channel 882 also extends diametrically at 90 degrees to the channel 880. Coolant flows from the coolant supply tube 815 and through the channels 880 and 882 to the coolant chamber 824. FIGS. 13 and 14 show the channels as having a triangular shape, however, the channels could be square, hemispherical, or of other cross section forming a channel for flow of the coolant. In addition it will be understood that this embodiment of the invention is not limited to having two channels 880 and 882, but rather an additional channel or channels may be added to increase the area available for flow of the coolant.

The foregoing description of the invention is merely exemplary in nature and, thus, variations thereof are intended to be within the scope of the invention. It may be desirable in implementing the invention that the coolant flow area between the side wall of the bore and the supply tube, and the coolant flow area between the bore end wall and the coolant supply tube end wall be approximately equal in area and be sized to maintain a constant and desired rate of flow of the coolant within the weld cap in order to optimize removal of heat from the weld cap. Although weld caps are commercially available in many sizes, we have determined that the bore end wall of the weld cap bore should be located in the range of 5-9 millimeters, and most preferably about 6 millimeters, from the end of the weld cap tip in order to obtain optimum cooling performance. In addition, although the drawings herein show the example of a female style cap that fits onto a male shank, the invention is applicable to the case of a male style cap that is threaded or press fit into a female style electrode shank.

What is claimed is:

1. A welding electrode having a hollow cap that is attached to a shank and a coolant supply tube extending through the shank to supply coolant to an underside of the cap, comprising:

the hollow cap having a cap tip adapted for placement against a work piece to be welded to conduct weld current to the work piece and having a cap underside that is spaced from the shank a cylindrical cap skirt integral with the cap tip and depending from the cap underside of the cap tip and removably attaching the cap to the shank and thereby forming a coolant tight chamber between the cap underside, the cap skirt, and the shank;

a coolant supply tube extending through the shank to conduct coolant to the coolant tight chamber and thereby conduct heat away from the cap tip;

a bore formed into the underside of the cap tip and having the coolant supply tube projecting into the bore and into spaced apart relation from the bore end wall to thereby supply coolant closer to the work piece than the cap underside and to define a bore side wall that provides added area of heat transfer contact between the coolant and the cap tip to thereby improve the cooling of the cap tip; and, a standoff abutment provided on one of the cap and the supply tube and engaging with the other of the cap and the supply tube to establish the spaced apart relation between the bore end wall and supply tube.

2. The welding electrode of claim 1 in which the bore side wall is a right circular cylindrical wall.

3. The welding electrode of claim 1 in which the bore is of a star shaped cross section so that the surface area of the bore wall is greater than the surface area of a circular cylindrical bore wall.

4. The welding electrode of claim 3 in which the bore wall is frustoconical in shape and the bore side wall is engageable by the coolant supply tube to establish the standoff abutment and a precise spacing between the end of the supply tube and the bore end wall.

5. The welding electrode of claim 1 in which a projection depends from the bore end wall and overlies the end of the supply tube so that the coolant exiting the supply tube impinges on the projection to prevent stagnation and promote turbulent flow of the coolant.

6. The welding electrode of claim 1 in which the bore end wall of the bore is a cylindrical dome.

7. The welding electrode of claim 1 in which the bore end wall is located 6 millimeters from the cap tip.

8. The welding electrode of the claim 1 in which the bore has at least one standoff abutment that projects from one of the bore end wall and the bore side wall to engage with the end of the supply tube and thereby prevent the bore end wall from too closely approaching the end of the supply tube and during installation of the cap onto the shank.

9. The welding electrode of claim 1 in which the stand off abutment is comprised by the bore end wall and the end of the supply tube being in direct engagement, and channels are formed in the end wall to provide a coolant flow passage from the supply tube into the coolant chamber.

10. The welding electrode of claim 9 in which the channels extend diametrically across the bore end wall and intersect with one another.

11. A welding electrode comprising;

a hollow cylindrical shank of electrically conducting metal and being connected to a resistance welder;

a coolant supply tube passing through the shank and having an interior supply passage and an outer diameter that is less that the inner diameter of the hollow cylindrical shank a weld cap seated upon the shank and having a cap tip adapted to engage with a work piece to be welded, a cap skirt that depends from the cap tip and attaches to the shank, and an underside of the cap tip that faces the shank and the supply tube;

a coolant receiving bore formed in the underside of the weld cap and extending into the cap tip and receiving the coolant supply tube at least part way into the bore so that coolant supplied through the supply tube effectively cools the cap tip; and, said coolant receiving bore having an end wall that is located in the range of 5-9 millimeters from the cap tip engaging the work piece.

12. The welding electrode of claim 11 in which the coolant receiving bore has a bore end wall and the coolant supply tube has an end that is spaced from the bore end wall to permit coolant flow.

13. The welding electrode of claim 12 in which the bore end wall is shaped to promote the diversion and flow of coolant.

14. The welding electrode of claim 11 in which the coolant receiving bore has an end wall and the supply tube has an end that engages with the wall and channels are provided in the end wall to permit flow of coolant.

15. The welding electrode of claim 12 in which the bore end wall is shaped to promote the diversion and flow of coolant.

16. The welding electrode of claim 11 in which the bore is star shaped in cross section.

17. The welding electrode of claim 11 in which the bore is circular in cross section.

18. A method of improving the heat transfer from a weld cap of a type that is removably mounted on a hollow shank and receives a flow of coolant through a coolant supply tube that reaches through the shank to the underside of the weld cap; comprising:

providing a bore in the underside of the weld cap to receive therein the end of a coolant supply tube therein and in closer proximity to the tip of the weld cap than would otherwise occur, said weld cap having a cap tip and said bore having an end wall located about 6 millimeters form the cap tip;

and relocating the mass of metal that was displaced by the bore hole elsewhere in the shape of the weld cap so that the weld cap remains of sufficient mass to act a temporary storage medium for the heat that is generated and awaiting dissipation by transfer to the coolant that is supplied into the bore by the coolant supply tube.

19. The method of claim 18 in which the mass of metal that is displaced from the weld cap by forming the bore is relocated to increase the outside dimension of the weld cap.

20. The method of claim 19 in which the bore end wall is located in the range of 5-9 millimeters from the cap tip.

21. The welding electrode of claim 1 in which the bore end wall is located in the range of 5-9 millimeters from the cap tip.

22. The welding electrode of claim 11 in which the bore end wall is located 6 millimeters from the cap tip.

* * * * *